US012764527B2

(12) United States Patent
Cuny-Pierron et al.

(10) Patent No.: US 12,764,527 B2
(45) Date of Patent: Oct. 13, 2026

(54) METHOD AND DATA CARRIER FOR TRANSMITTING A DATA STREAM

(71) Applicants: Manfred Cuny-Pierron, Vienna (AT); Daniel Hutter, Vienna (AT); Reinhold Weber, Vienna (AT)

(72) Inventors: Manfred Cuny-Pierron, Vienna (AT); Daniel Hutter, Vienna (AT); Reinhold Weber, Vienna (AT)

( * ) Notice: Subject to any disclaimer, the term of this patent is extended or adjusted under 35 U.S.C. 154(b) by 495 days.

(21) Appl. No.: 18/267,265

(22) PCT Filed: Aug. 11, 2021

(86) PCT No.: PCT/EP2021/072367
§ 371 (c)(1),
(2) Date: Jun. 14, 2023

(87) PCT Pub. No.: WO2022/144097
PCT Pub. Date: Jul. 7, 2022

(65) Prior Publication Data

US 2024/0048980 A1 Feb. 8, 2024

(30) Foreign Application Priority Data

Dec. 31, 2020 (AT) .................................. 60382/2020

(51) Int. Cl.
*H04M 1/66* (2006.01)
*H04B 5/26* (2024.01)
(Continued)

(52) U.S. Cl.
CPC .............. *H04W 12/06* (2013.01); *H04B 5/26* (2024.01); *H04W 12/108* (2021.01); *H04W 76/15* (2018.02); *H04B 5/70* (2024.01)

(58) Field of Classification Search
CPC ... H04W 12/06; H04W 76/15; H04W 12/108; H04B 5/0031
(Continued)

(56) References Cited

U.S. PATENT DOCUMENTS 9,185,501 B2 * 11/2015 Pai ........................ H04R 25/554
9,276,639 B2 * 3/2016 Terlizzi .................. H04B 5/263
(Continued)

FOREIGN PATENT DOCUMENTS

CN 206993381 2/2018
EP 3 493 556 6/2019

OTHER PUBLICATIONS

Int'l Search Report (Form PCT/ISA/210) conducted in Int'l Appln. No. PCT/EP2021/072367 (Nov. 25, 2021).
(Continued)

*Primary Examiner* — Marceau Milord
(74) *Attorney, Agent, or Firm* — GREENBLUM & BERNSTEIN, P.L.C.

(57) ABSTRACT

Method for transmitting a data stream between a mobile data carrier and a playback device, in which authentication data for setting up a second transmission channel from the data carrier to the playback device is transmitted via a first transmission channel set up between the data carrier and the playback device by an electromagnetic field emitted by the playback device. Following verification of authentication data, the second transmission channel is set up, via which the data stream is transmitted from the data carrier to the playback device by a radio signal from a transmitting antenna of the data carrier. The power supply to the transmitting antenna is provided via the first transmission channel, and the second transmission channel is maintained only as long as the first transmission channel is maintained.

11 Claims, 3 Drawing Sheets

Figure 1:
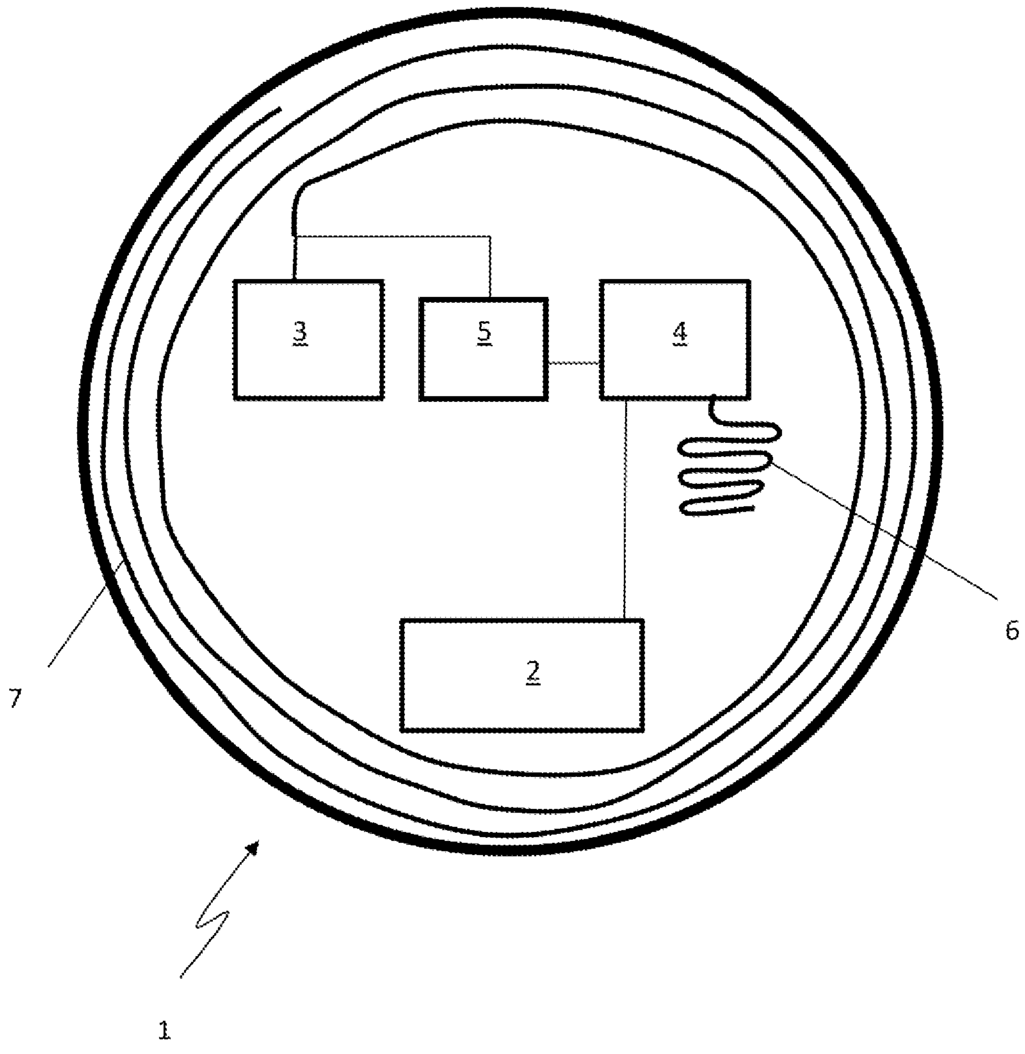

(51) Int. Cl.

| | |
|---|---|
| ***H04M 1/68*** | (2006.01) |
| ***H04M 3/16*** | (2006.01) |
| ***H04W 12/06*** | (2021.01) |
| ***H04W 12/108*** | (2021.01) |
| ***H04W 76/15*** | (2018.01) |
| *H04B 5/70* | (2024.01) |

(58) Field of Classification Search

USPC .......................................................... 455/410

See application file for complete search history.

(56) References Cited

U.S. PATENT DOCUMENTS

| | | | | |
|---|---|---|---|---|
| 10,356,537 | B2 * | 7/2019 | Niklaus | H04R 25/55 |
| 11,545,841 | B2 * | 1/2023 | Lemahieu | H01M 10/482 |
| 11,595,081 | B2 * | 2/2023 | Tramoni | H04B 5/77 |
| 11,641,573 | B2 * | 5/2023 | Suzuki | H04L 63/101 726/7 |
| 11,733,950 | B2 * | 8/2023 | Suzuki | H04N 1/00912 358/1.14 |
| 11,943,497 | B2 * | 3/2024 | Curtis | H04N 21/44227 |
| 2011/0234013 | A1 * | 9/2011 | Hatakeyama | H02J 50/10 307/104 |
| 2013/0127404 | A1 * | 5/2013 | Maenpaa | H02J 50/10 320/108 |
| 2013/0344806 | A1 * | 12/2013 | Pai | A61J 1/00 455/41.1 |
| 2014/0241555 | A1 * | 8/2014 | Terlizzi | H02J 50/12 320/108 |
| 2015/0003630 | A1 * | 1/2015 | Qian | H04W 4/80 381/79 |
| 2019/0174239 | A1 * | 6/2019 | Niklaus | H04R 25/558 |
| 2022/0046311 | A1 * | 2/2022 | Curtis | H04N 21/4307 |

OTHER PUBLICATIONS

Int'l Written Opinion (Form PCT/ISA/237) conducted in Int'l Appln. No. PCT/EP2021/072367 (Nov. 25, 2021).

Int'l Prelim. Exam. Report (Form PCT/IPEA/409) conducted in Int'l Appln. No. PCT/EP2021/072367 (Jun. 2, 2022).

* cited by examiner

METHOD AND DATA CARRIER FOR TRANSMITTING A DATA STREAM

The invention relates to a method for transmitting a data stream between a mobile data carrier and a playback device for the transmitted data according to the preamble of claim 1, and to a data carrier comprising a data memory retrievable by a playback device according to the preamble of claim 7.

The storage, distribution and consumption of audiovisual data, in particular media content such as music and the like, have changed fundamentally in recent years. EP 3 493 556 describes the coupling of two hearing aids to one another and to an NFC-enabled device for playing back audio content. The digitization of audiovisual data has pushed back the use of storage media used exclusively for storing media content. Instead, media content is stored on external servers ("cloud") or on playback devices such as mobile terminals ("smartphones"), tablets or laptops that are not exclusively used for playing back media content. New payment systems have been established in which payment is not made for physical data carriers containing audiovisual content, but for the audiovisual data itself. This data is readily available, transferable and storable, so that with the current forms of storage and distribution of audiovisual content, the creator of the data, such as the artist, no longer has any control over the long-term distribution of the media content. As a result, except for the initial publication of the audiovisual content, for which financial compensation is usually possible, the creator of media content no longer receives any or any appropriate compensation for the further use of the media content he or she has created. Rather, the media content created in this way serves a variety of other business models as supposedly freely available "content". The media content creator also no longer has any way of knowing how often the media content he or she has provided is shared and how often it was ultimately actually heard or seen.

In addition, the availability of audiovisual data at any time and any place has reduced the appreciation of the artistic performance of the creator of audiovisual content such as music and the like and the willingness to pay for this performance in general. The detachment from storage media that can be experienced haptically, such as records, CDs or the like, have deprived the consumer of the impression of "owning" the audiovisual content and therefore reduced the willingness to pay appropriately for it.

It is therefore an object of the invention to provide a form of storage and transmission of audiovisual data that allows the creator of the audiovisual data to control the distribution and consumption of the audiovisual data.

This object is achieved by the features of claims 1 and 7, respectively. Claim 1 relates to a method for transmitting a data stream between a mobile data carrier and a playback device for the transmitted data, wherein authentication data for setting up a second transmission channel from the data carrier to the playback device is transmitted via a first transmission channel set up between the data carrier and the playback device by means of an electromagnetic field emitted by the playback device via electromagnetic induction in the mobile data carrier, and following verification of the authentication data, the second transmission channel is set up between the data carrier and the playback device, via which channel the data stream is transmitted from the data carrier to the playback device by means of a radio signal from a transmitting antenna of the data carrier. According to the invention, it is proposed that; the power supply to the transmitting antenna of the second transmission channel is provided via the first transmission channel, and the second transmission channel is maintained only as long as the first transmission channel, whose maintenance depends on the spatial distance between the data carrier and the playback device, is maintained.

The method according to the invention thus provides for a mobile data carrier, which will be described in more detail below. The retrieval of data from the mobile data carrier requires the prior establishment of a first transmission channel by means of an electromagnetic field emitted by the playback device via electromagnetic induction in the mobile data carrier. Electromagnetic induction can be used on the one hand to transmit smaller data packets, as is known from passive transponders, for example, and on the other hand to excite current that can be used to supply power to electrical components in the mobile data carrier. The first transmission channel is thus used to transmit electrical energy and smaller data packets, but it can only be maintained over small spatial distances due to the quadratic decrease in electromagnetic field strength with distance from the exciting playback device. This characteristic of magnetic induction is desirable in the context of the present invention because it requires physical proximity of the mobile data carrier to the playback device to establish the first transmission channel.

The first transmission channel is hardly suitable for the transmission of a continuous data stream and is also not intended for the transmission of audiovisual data. Instead, authentication data is transmitted to set up a second transmission channel from the data carrier to the playback device. These authentication data are comparatively small data packets whose contents will be described in more detail below. After verification of the authentication data, the second transmission channel is established between the data carrier and the playback device, via which the data stream is transmitted from the data carrier to the playback device by means of a radio signal from a transmitting antenna of the data carrier. If verification cannot be performed, the second transmission channel is not established and transmission of a data stream is omitted.

According to the invention, power is supplied to the transmitting antenna of the second transmission channel via the first transmission channel, wherein the second transmission channel is maintained only as long as the first transmission channel, whose maintenance depends on the spatial distance between the data carrier and the playback device and via which the electrical energy required for operation of the transmitting antenna is transmitted, is maintained. In other words, if the mobile data carrier is removed from the playback device, the transmitting antenna of the second transmission channel does not receive any electrical energy for its transmission operation and the second transmission channel can no longer transmit the data stream.

The transmission of the data stream thus requires a physical presence of the mobile data carrier, the data carrier must therefore be "in possession" of the user. However, the data stream is only transmitted after authentication data has been verified. This authentication data is used to set up the second transmission channel, but can also include authorization to retrieve the data for a specific user. One possibility is, for example, that the authentication data contains identification information with which each mobile data carrier is provided. This identification information is assigned by a provider and uniquely identifies the respective data carrier. The playback device has a program library that contains all the identification information assigned by the provider and, when authentication data is received, checks the identification information contained to see whether it is identification information assigned by the provider.

Another possibility is proposed in the case that the playback device is a mobile terminal. The mobile terminal may be a cell phone ("smartphone"), or also a tablet, a laptop or any other device equipped with a router or gateway that can establish and use mobile radio connections. Such a mobile terminal may be provided with a mobile application (for example, as an "app") that establishes a data connection and exchanges data with a remote, central data processing facility, such as a provider's server. In this case, it is proposed that the authentication data includes identification information for identifying the mobile data carrier, and verification of the authentication data is carried out using the identification information, wherein the playback device is a mobile terminal with a mobile application that sends the identification information transmitted via the first transmission channel to a central data processing device, and after verification of the identification information by the central data processing device, the second transmission channel is established between the data carrier and the playback device. Thus, the verification of the authentication data is not performed locally in the playback device, but externally with the support of a central data processing device. In this case, it would even be conceivable to link the successful verification of the authentication data with the successful recognition of a playback device authorized for a particular data carrier. This functionality can be used as an anti-theft device, but also enables logging of how often a particular media content is accessed and by whom. This information could be used for novel payment systems.

With regard to the first transmission channel, it is proposed that the first transmission channel is an NFC (Near Field Communication) transmission channel. NFC is an international transmission standard based on RFID technology for contactless exchange of data between two briefly paired devices via electromagnetic induction over short distances of a few centimeters. Mobile terminals such as smartphones and the like are increasingly NFC-enabled. With the help of the WLC ("Wireless Charging Specification") standard, which was the latest at the time of application, it is also possible to use the 13.56 MHz frequency band used by NFC to charge electronic devices with a maximum power of 1 watt according to the WLC specification at the time of application. Thus, at the time of application, NFC- and WLC-enabled playback devices such as smartphones and the like already exist that can not only read data packets from mobile data carriers using NFC, but also serve as a power source for charging the power storage of electronic devices using WLC. However, WLC has not yet been proposed as a "real-time" power source for transmitting antennas of, for example, "Bluetooth Low Energy (BLE)" circuit boards in the context of BLE technology without intermediate storage in an internal power storage device. In the context of the present invention, NFC is proposed for establishing the first transmission channel for transmitting authentication data as well as for transmitting electrical energy from the playback device to the mobile data carrier. Another possibility for transferring electrical energy exists at the time of application in the Qi charging standard.

With respect to the second transmission channel, it is proposed that the second transmission channel is a Bluetooth, WLAN, or UWB transmission channel. In a corresponding manner, it is proposed that the authentication data contain Bluetooth, WLAN, or UWB authentication data for establishing the second transmission channel. For example, one possibility is to use a "Bluetooth Low Energy (BLE)" circuit board that can be used to exchange data with other devices within a limited radius of up to 10-100 m, while keeping power consumption very low. The power requirement of the "Bluetooth Low Energy (BLE)" circuit board for the second transmission channel is covered by the electrical energy transmitted via the first transmission channel.

The data stream subsequently transmitted via the second transmission channel may be audiovisual streaming data. Such streaming data is transmitted in the conventional manner, for example using HTTP streaming, wherein the audiovisual data is divided into small sections of the entire file and transmitted as data segments. Each segment contains a certain number of bits. Part of the bits forms the actual payload data and another part of the bits forms a data header block that contains certain control information. This control information is used by the playback device to correctly receive and process the data segments. The transmission protocols used for this are usually TCP (Transmission Control Protocol), UDP (User Datagram Protocol) and IP (Internet Protocol). In the playback device, the segments must subsequently be reassembled in such a way that continuous playback of the entire data stream is possible. Although this process causes latency times of sometimes several seconds, which are primarily due to the transmission protocols currently in use, such as HLS or MPEG-DASH, and the intermediate buffering of the data used in this process and the reassembly of the individual data segments into a playable data stream, it generally ensures successful and complete transmission of audiovisual data via the second transmission channel.

The invention further relates to a data carrier having comprising one of a data memory retrievable by a playback device, an inductive element for setting up a first transmission channel for retrieving authentication data of the data carrier and for inducing a current by an external electromagnetic field, and a transmitting antenna for establishing a second transmission channel transmitting a data stream from the data memory, wherein in which it is proposed that it is designed as a token-shaped body and the power supply of the transmitting antenna is formed by the inductive element. On the one hand, the design as a token-shaped body with a round, square or rectangular shape and low height favors the close placement of the data carrier on the playback device, for example by placing it on the playback device, for example in a receptacle on the playback device specifically provided for the data carrier, into which the data carrier can be inserted, and, on the other hand, favors the required process of electromagnetic induction for the first transmission channel. In addition, the design as a token-shaped body promotes the haptic effect and reminds the user remotely of familiar storage forms such as CD or minidisk. For example, for a possible embodiment of the data carrier, it is proposed that it is disk-shaped with a radius of 1.5-3.5 cm and a thickness of 1-5 mm. Such a compact data carrier is also suitable for playing the media content in portable devices such as wireless headphones by inserting the data carrier into a corresponding receptacle of the portable device.

With regard to the inductive element, it is proposed that the inductive element is designed as an electrical conductor wound around the center of the token-shaped body. In this way, the entire cross-section of the token-shaped body is utilized to achieve the electromagnetic induction. In particular, it may be provided that the inductive element is designed as an NFC-enabled element and the transmitting antenna is designed as a Bluetooth-, WLAN- or UWB-enabled transmitting antenna.

Figure 2:
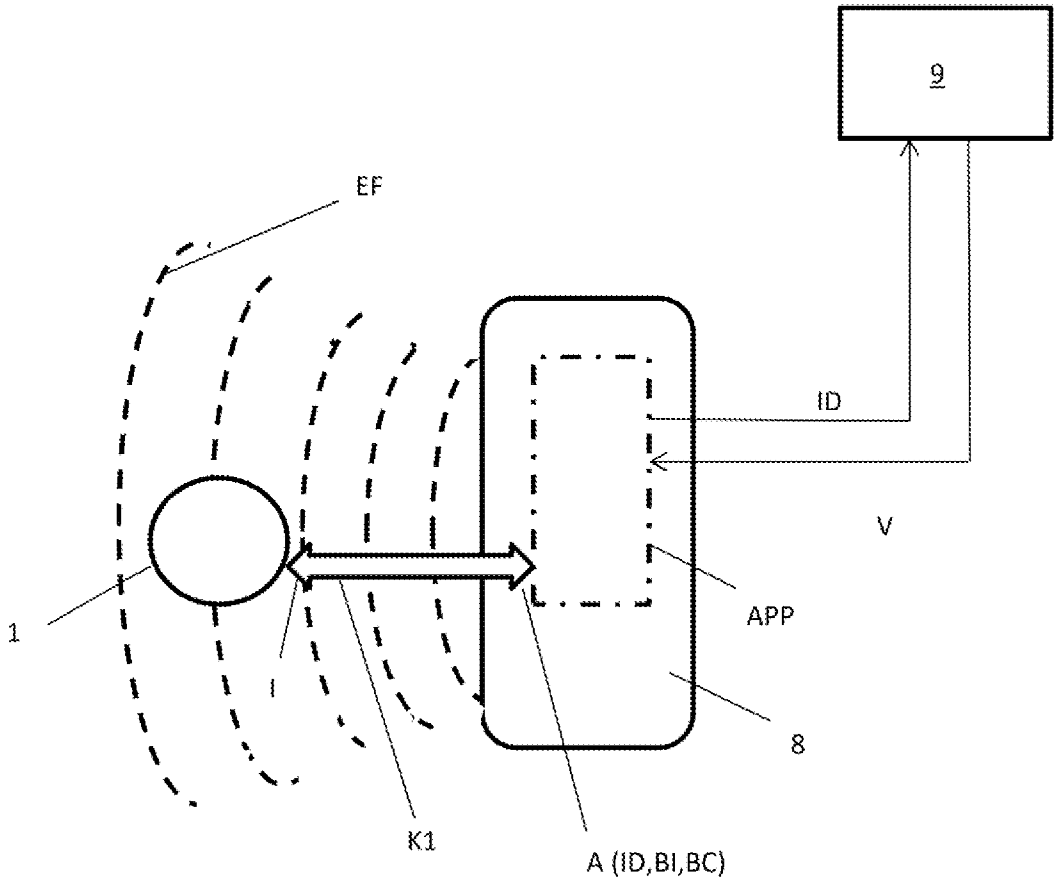
Figure 3:
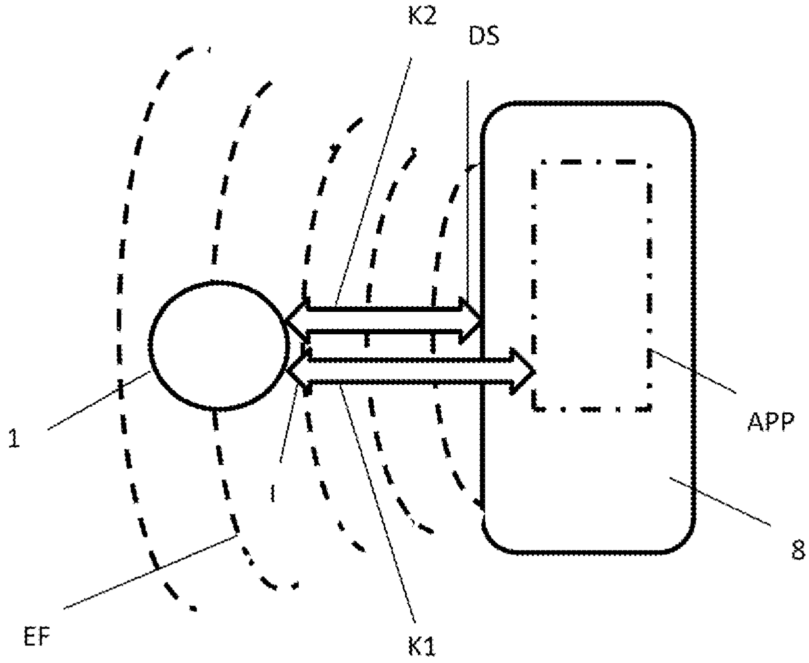
Figure 4:
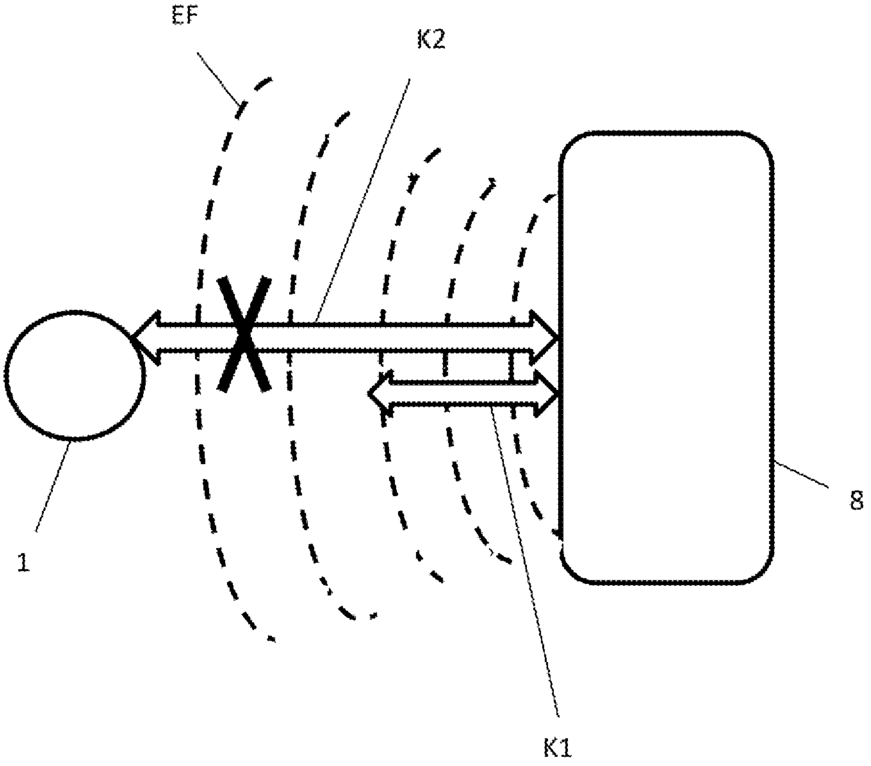

The invention is explained in more detail below by means of exemplary embodiments with the aid of the accompanying figures. The figures show as follows:

FIG. 1 shows a schematic view of a possible embodiment of a mobile data carrier according to the invention, FIG. 2 shows a schematic view of the interaction of a data carrier according to the invention with a playback device in the form of a smartphone for the method step of setting up the first transmission channel, FIG. 3 shows a schematic view of the interaction of a data carrier according to the invention with a playback device in the form of a smartphone for the method step of setting up the second transmission channel, and the FIG. 4 shows a schematic view of the interaction of a data carrier according to the invention with a playback device in the form of a smartphone for the method step of disconnecting the second transmission channel.

Reference is first made to FIG. 1, which shows a schematic view of a possible embodiment of a mobile data carrier 1 according to the invention. The data carrier 1 is designed as a token-shaped body in the form of a disk-shaped plastic carrier with a radius of 1.5-3.5 cm and a thickness of 1-5 mm. A data memory 2, an NFC chip 3 with an inductive element 7 designed as an NFC antenna, a "Bluetooth Low Energy (BLE)" chip 4 with a transmitting antenna 6 designed as a Bluetooth antenna, and a WLC chip 5 are arranged in the plastic carrier.

The data memory 2 contains the audio-visual streaming data to be transmitted as data stream DS. The NFC chip 3 contains the authentication data A, which will be described in further detail below, and which can be retrieved via an electromagnetic field EF interacting with the inductive element 7 (see FIG. 2). For this purpose, the inductive element 7 is designed as an electrical conductor wound around the center of the token-shaped body, which is connected to the NFC chip 3 as well as to the WLC chip 5. Together with the NFC chip 3, the inductive element 7 constitutes an NFC-enabled element. Together with the WLC chip 5, the inductive element 7 constitutes a WLC-enabled element for exciting an electric current using an electromagnetic field excited by a playback device 8 and serving as a power supply for the BLE chip 4. The BLE chip 4 is connected to the data storage device 2 and transmits the data stream DS retrieved from the data storage device 2 via the transmitting antenna 6 configured as a Bluetooth antenna when the power supply is maintained by the WLC chip 5.

The transmission of the data stream DS is therefore only possible if the data carrier 1 is very close to the playback device 8 and ideally rests on the playback device 8 in the vicinity of the emission source of the electromagnetic field EF excited by the playback device 8, even if in FIGS. 2-4 the data carrier 1 has been drawn at a short distance from the playback device 8 for the sake of clarity. Indeed, powering the BLE chip 4 via the WLC chip 5 is possible only when the data carrier 1 is in close proximity to the playback device 8 serving as the source of the electromagnetic field EF, when the electromagnetic field EF excited by the playback device 8 can optimally penetrate the inductive element 7 and thereby retrieve the authentication data A and excite an electric current I (see FIG. 3) in the inductive element 7.

As soon as the data carrier 1 is very close to the playback device 8, there is an interaction between the electromagnetic field EF emitted by the playback device 8 and the inductive element 7. A first effect of this interaction is the transmission of authentication data A (see FIG. 2) via a first transmission channel K1 in the form of an NFC transmission channel. This authentication data A includes an identification information ID for identifying the mobile data carrier 1, a command code BC requesting the playback device 8 to start a mobile application APP preinstalled by the user if this mobile application APP is not already running in the background on the playback device 8 anyway, and Bluetooth authentication data BI for establishing a Bluetooth connection as a second transmission channel K2.

As indicated in FIG. 2, the authentication data A is subjected to a verification V by sending the identification information ID from the playback device 8 to a central data processing device 9 in which the verification V is carried out. This verification V may consist of comparing the transmitted identification information ID with the identification information ID present in a program library to check whether the data carrier 1 is a known and authorized data carrier 1.

However, the verification V may also consist of checking whether there is an authorization of the playback device 8 to play the data stream DS. In the central data processing device 9, the information is subsequently available as to which data carrier 1 was retrieved by which playback device 8, which can be valuable for further evaluation, for example in the context of payment systems. The provision of the data stored in the data memory 2 for the data stream DS to be transmitted can be carried out via a first provider, for example an artist who creates music in the form of audio-visual data. The operation of the central data processing device 9 may be performed by the first provider or also by an operator of the method according to the invention, wherein the operator of the method according to the invention may be identical to the first provider, but need not be.

After verification V of the identification information ID by the central data processing device 9, the second transmission channel K2 is established between the data carrier 1 and the playback device 8 in the form of a Bluetooth connection (see FIG. 3). Electrical energy is further transmitted via the first transmission channel K1 and a current I is induced in the data carrier 1, which starts up the BLE chip 4 and its transmitting antenna 6 via the WLC chip 5.

Subsequently, the audiovisual data of the data storage device 2 is transmitted to the playback device 8 as a data stream DS in the form of streaming data and can be played back by the playback device 8. At this point, however, it should be mentioned that the data stream DS could also be non-audiovisual data in the form of documents and the like.

As soon as the data carrier 1 is removed from the playback device 8, the electromagnetic induction in the data carrier 1 comes to a standstill and the BLE chip 4 and its transmitting antenna 6 are no longer supplied with current I. This is indicated in FIG. 4 by the crossed transmission channel K2. As a result, the second transmission channel K2 breaks down, which is indicated by the crossed transmission channel K2 in FIG. 4. Therefore, the data stream DS can also no longer be transmitted to the playback device 8.

The invention thus provides a form of storage and transmission of audiovisual data which enables the creator of the audiovisual data to control the distribution and consumption of the audiovisual data, in that it is not only possible for him to obtain information about the distribution and ownership of media content by means of an initial sale of the data carrier 1, which would in principle also be possible in a personalized form, but also to obtain information about further distribution and the frequency of media use. Furthermore, it is also possible to regain independence from currently prevailing distribution systems which hardly allow the artist and creator of the media content any more control over distribution and exploitation of the media content by creating an infrastructure of one's own in the form of the data carrier 1, the mobile application APP and the central data processing device 9.

The invention claimed is:

1. A method for transmitting a data stream between a mobile data carrier and a playback device for the transmitted data, the method comprising:

transmitting, via a first transmission channel between the mobile data carrier and the playback device, which is set up by an electromagnetic field emitted by the playback device and electromagnetic induction in the mobile data carrier, authentication data for setting up a second transmission channel from the mobile data carrier to the playback device, and following verification of the authentication data, setting up the second transmission channel between the mobile data carrier and the playback device, wherein the data stream from the mobile data carrier to the playback device is transmitted via the second transmission channel by a radio signal from a transmitting antenna of the mobile data carrier, wherein power is supplied to the transmitting antenna of the mobile data carrier via the first transmission channel, and wherein the second transmission channel is maintained only as long as the first transmission channel, whose maintenance depends on a spatial distance between the mobile data carrier and the playback device, is maintained.

2. The method according to claim 1, wherein the authentication data contains identification information for identifying the mobile data carrier, and the verification of the authentication data is carried out with the aid of the identification information, wherein the playback device is a mobile terminal having a mobile application which sends the identification information transmitted via the first transmission channel to a central data processing device, and whereby, following verification of the identification information by the central data processing device, the second transmission channel is set up between the mobile data carrier and the playback device.

3. The method according to claim 1, wherein the first transmission channel is an NFC (Near Field Communication) transmission channel.

4. The method according to claim 1, wherein the second transmission channel is a Bluetooth, WLAN or UWB transmission channel.

5. The method according to claim 4, wherein the authentication data contains Bluetooth, WLAN or UWB authentication data for setting up the second transmission channel.

6. The method according to claim 1, wherein the data stream transmitted via the second transmission channel is audio-visual streaming data.

7. A data carrier comprising:

a data memory retrievable by a playback device, an inductive element configured for setting up a first transmission channel for retrieving authentication data of the data carrier and for inducing a current by an external electromagnetic field, and a transmitting antenna for establishing a second transmission channel for transmitting a data stream from the data memory, wherein the data carrier is configured with a token-shaped body, and wherein a power supply of the transmitting antenna is formed by the inductive element.

8. The data carrier according to claim 7, wherein the token-shaped body is disk-shaped with a radius of 1.5-3.5 cm and a thickness of 1-5 mm.

9. The data carrier according to claim 7, wherein the inductive element is designed as an electrical conductor wound around a center of the token-shaped body.

10. The data carrier according to claim 7, wherein the inductive element is designed as an NFC-enabled element and the transmitting antenna is designed as a Bluetooth-, WLAN- or UWB-enabled transmitting antenna.

11. The data carrier according to claim 7, wherein the authentication data contains identification information for identifying the mobile data carrier, and the verification of the authentication data is carried out with the aid of the identification information, wherein the playback device is a mobile terminal having a mobile application which sends the identification information transmitted via the first transmission channel to a central data processing device, and whereby, following verification of the identification information by the central data processing device, the second transmission channel is set up between the data carrier and the playback device.

* * * * *